United States Patent [19]
Moller

[11] Patent Number: 5,261,743
[45] Date of Patent: Nov. 16, 1993

[54] APPARATUS AND METHODS FOR FEEDING A SUBSTANTIALLY UNIFORM QUANTITY OF A MIXTURE OF MATERIALS HAVING VARIABLE INDIVIDUAL DENSITIES

[75] Inventor: Richard W. Moller, Fenton, Mich.

[73] Assignee: Hydreclaim Corporation, Fenton, Mich.

[21] Appl. No.: 53,596

[22] Filed: Apr. 27, 1993

[51] Int. Cl.⁵ .............................................. B01F 15/02
[52] U.S. Cl. ..................................... 366/196; 366/20; 366/76; 366/151; 366/132; 222/63; 264/40.7; 264/DIG. 69; 425/145
[58] Field of Search ............... 366/151, 152, 195, 196, 366/17, 20, 76, 131, 132; 264/40.4, 40.7, 40.1, 349, DIG. 69; 425/145, 148; 222/52, 63

[56] References Cited
U.S. PATENT DOCUMENTS 4,091,462  5/1978  Igarashi .............................. 366/151
4,108,334  8/1978  Moller ................................. 222/136
5,045,252  9/1991  Hahn ..................................... 222/63
5,110,521  5/1992  Moller ................................. 366/152
5,110,522  5/1992  Inaba .................................. 264/40.4

Primary Examiner—Robert W. Jenkins
Attorney, Agent, or Firm—Learman & McCulloch

[57] ABSTRACT

Apparatus and methods for mixing plastic materials having different densities to supply a substantially uniform quantity of the mixture of such materials to an extruder or other processing machine. The mixture of materials is fed forcibly from the mixer to the processing machine by a variable speed auger. The mixture exerts a reactive force on the auger commensurate with the bulk density of the mixture. A sensor detects variations in the reactive force and produces signals which adjust the rate of rotation of the auger in inverse relation to the variations in the bulk density of the mixture to maintain the quantity of the mixture discharged from the mixer per unit of time within a selected range.

19 Claims, 1 Drawing Sheet

APPARATUS AND METHODS FOR FEEDING A SUBSTANTIALLY UNIFORM QUANTITY OF A MIXTURE OF MATERIALS HAVING VARIABLE INDIVIDUAL DENSITIES

This invention relates to the mixing and feeding of plastic materials having different densities to a plastics extruder or the like and more particularly to the feeding of a mixture of such materials wherein the mass or quantity of the mixture delivered to the extruder is maintained within a selected range eve though the densities of the individual components of the mixture vary during the mixing and delivery of the mixture.

BACKGROUND OF THE INVENTION

The production of products from extruded or blown plastics generates plastic scrap. It is conventional to grind or chop the scrap and mix it with virgin or base plastics so that the scrap can be reused in the production of new products. Apparatus suitable for mixing virgin and scrap materials is disclosed in U.S. Pat. No. 4,108,334.

One of the problems encountered in the mixing and feeding of virgin and scrap plastics is that of maintaining a selected quantity or mass of the mixture delivered to the extruder. This problem is due in large part to variations in the densities of the materials being mixed. The density of the virgin plastic is relatively easy to control because it commonly is composed of rigid, flowable pellets of substantially uniform consistency and size. However, the scrap can, and usually does, consist of particles of greatly differing size, form, and densities. As a consequence, the bulk density of the mixture and the mass thereof discharged to an extruder may vary within wide limits.

Variations in the quantity of material delivered during a given period of time to an extruder for extrusion is undesirable for a number of reasons, among which is the inability to maintain uniformly filled spaces between adjacent vane convolutions of a helical, extruder feed screw. For example, if a mixture having a given bulk density is fed at a constant rate to fill the space between adjacent convolutions of an extruder screw, a reduction in the bulk density of the mixture can cause such space to be underfilled. This can cause non-uniform pressure at the discharge outlet of the extruder and the production of so-called gels, i.e., unmelted plastic particles in the product. The presence of gels is undesirable inasmuch as they contribute to the generation of more scrap.

The problems in using a mixture of virgin and recycled scrap plastics materials have been recognized heretofore and a number of solutions advanced. One proposed solution involves slaving the rate of delivery of the virgin/scrap mixture to the speed of rotation of a variable speed extruder feed screw. As the speed of the extruder feed screw changes, the speed of the scrap delivery to the system is correspondingly changed. One difficulty with this proposal is that it does not necessarily respond to variations in the bulk density of the virgin/scrap mixture, nor does it enable a consistent feed force to be maintained on the mixture as it is delivered to the extruder. Consequently, the quantity of the mixture actually delivered to the extruder may experience wide variations.

Another proposal to solve the problems of feeding a mixture of virgin and scrap materials to an extruder is to premix the rigid pellets and the fluffy scrap with one another and convey the mixture to an upright, conical hopper having a vertical, motor driven feed auger which forces the mixture from the hopper into the extruder inlet. This proposal requires the use of a special, electric torque control on the feed auger drive motor, such control being operable to maintain a preset voltage on the drive motor to enable the speed of the motor to vary in response to changes in its torque. This system requires not only a special motor and drive assembly, but also an expensive torque responsive device. In addition, the time and equipment required to premix the virgin and scrap materials represents substantial expense.

An object of this invention is to provide a method and apparatus for feeding a mixture of different density virgin and scrap plastic materials to an extruder and wherein the feed rate of the mixture is varied in response to changes in the bulk density of the mixture to maintain substantially uniform the quantity of the mixture delivered to the extruder per unit of time, thereby overcoming the disadvantages of methods and apparatus heretofore proposed for making use of a blend of virgin and scrap materials.

SUMMARY OF THE INVENTION

The feeding of a substantially uniform quantity of a mixture of a plurality of different density materials per unit of time is initiated by delivering the different materials along different paths from supplies thereof to a mixer in which the different materials are mixed to form the mixture.

A rotatable and axially movable feed auger is driven by a variable speed motor in a direction to feed the mixture from the mixer to the inlet of an extruder or other processing machine. Movement of the mixture toward the extruder generates a reactive force or resistance on the feed auger which tends to displace the latter axially in a direction opposite that in which the mixture is fed. The auger or its drive motor is mounted on an electrical load cell sensor which is operable to generate a signal in response to axial movement of the auger through a predetermined distance. The signal generated by the sensor is transmitted to a control computer which in turn effects a change in the rate of rotation of the auger to maintain within a selected range the quantity of the mixture discharged to the extruder.

The arrangement is such that, should the density of the mixed material increase or decrease, due to a change in the density of either the scrap or the virgin material, the variations in bulk density will cause the auger to be displaced axially in one direction or the other and generate a signal by the sensor to effect an increase or decrease in the rate of rotation of the auger so that the quantity of the mixture fed to the extruder per unit of time will conform to a selected range.

The range in the quantity of material discharged from the mixer to the extruder may be selected by adjustment of the sensor, or the computer, or both, in known manner.

DESCRIPTION OF THE PREFERRED EMBODIMENTS

Figure 2:
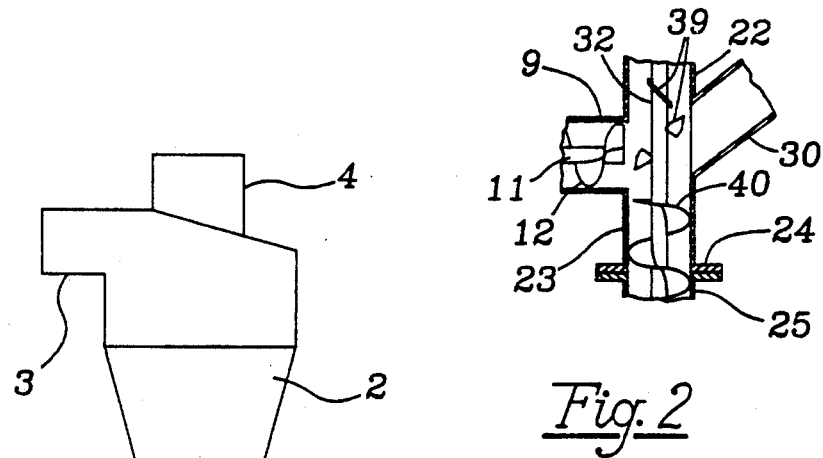
FIG. 2 is a fragmentary, similar view of a modified embodiment.

Apparatus constructed in accordance with one embodiment of the invention is disclosed in FIG. I and comprises a scrap hopper 1 that is adapted to accommodate a supply of ground or chopped plastic scrap discharged from a cyclone separator 2 having a scrap inlet 3, an air vent 4, and a scrap outlet 5. The hopper 1 has an upper scrap-receiving bin 6 connected at its lower end to a downwardly tapering housing 7 having a discharge outlet (not shown) at its lower end as is conventional. The housing preferably has a clear window 8 therein through which the contents of the hopper ma be viewed.

The interior of the housing 7 communicates with a tubular auger housing 9 within which is rotatably mounted an auger 10 having a rotary shaft 11 on which is secured a continuous helical vane 12. The shaft 11 extends through the housing 9 into another housing 13 and is suitably journalled therein by appropriate bearings. The shaft 11 is coupled to an electric or hydraulic motor 14 so that rotation of the motor causes corresponding rotation of the auger 10 in a direction to move material in the auger housing 9 from left to right, as viewed in FIG. 1.

The shaft 11 is coupled by a chain 16 or other suitable means to a shaft 17 which is journalled in the housing 7 and extends from the housing 13 through the housing 7. Fixed on the shaft 17 within the housing 7 is an agitator 18 having blades 19 which rotate about the axis of the shaft 17 in response to operation of the motor 14. The agitator 18 prevents bridging of the scrap material at the bottom of the housing 7 and ensures a continuous supply of scrap material to the auger The auger housing 9 communicates with an upright, tubular mixer 20 having an intermediate blending portion 21 to which is connected an upper extension 22 and a lower extension 23 terminating at its lower end in a flange 24 which may be secured to the flanged inlet 25 of a conventional plastics extruder 26 or other suitable plastics receiving and processing machine having a helical feed screw 27 therein.

The apparatus also includes a hopper 28 forming a supply for rigid, virgin, plastic pellets. The hopper 28 has a conical lower end 29 to which is coupled one end of a delivery chute 30, the opposite end of which communicates with the blending portion 21 of the mixer 20. Plastic pellets may flow by gravity from the hopper 28 through the chute 30 to the mixer 2 simultaneously with the delivery of scrap material to the mixer by the auger 10. However, a feed auger (not shown) may be accommodated in the chute 30 if desired or necessary.

Secured to the housing 7 and overhanging the mixer 20 is a support 31 in which is slideably and rotatably journalled a vertically extending axially movable feed shaft 32. The shaft 32 extends above the support 31 and is supported in and coupled by an appropriate gear box 33 to a variable speed electric or hydraulic motor 34 which is fixed on a vertically movable base 35. A guide pin 36 fixed to the support 31 extends through an opening in the base 35 to guide the latter in its vertical movements and prevents any other relative movement between the base 35 and the support 31. The base 35 bears on an electrical load cell sensor 37 of known construction which is interposed between the support 31 and the base 35. A load cell corresponding to Model 1050 sold by Tedea-Huntleigh, Inc., Canoga Park, Calif., is satisfactory.

The mixer shaft 32 has, at least in the blending portion 21 of the mixer 20, a plurality of axially and circumferentially spaced vane or flight segments 39 which also are inclined to the vertical and circumferentially spaced at an angle of about 45°. The segments 39 correspond to those disclosed in the aforementioned patent.

Figure 1:
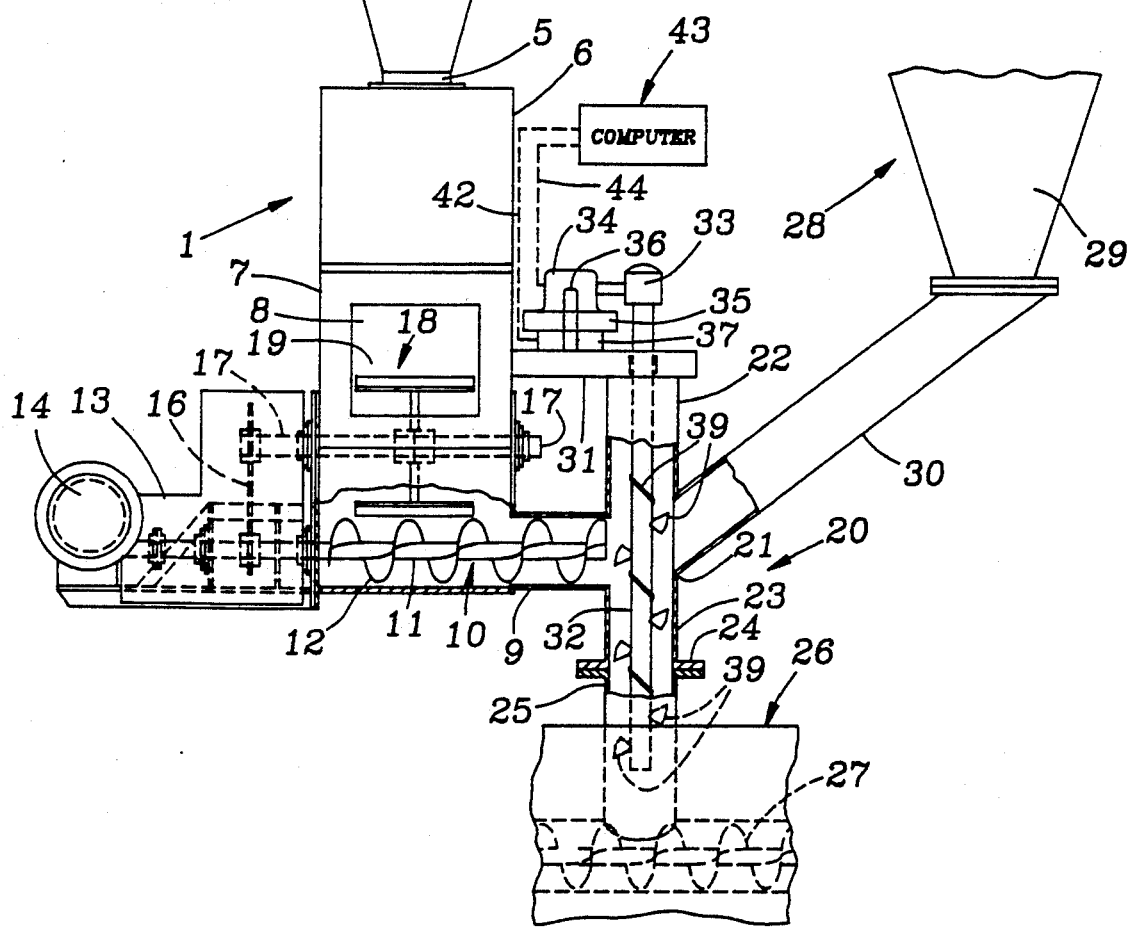
FIG. 1 is a partly diagrammatic side elevational view of apparatus constructed in accordance with one embodiment of the invention.

In the embodiment shown in FIG. 1, the flight segments 39 are spaced along the entire length of the shaft 32. In the embodiment of FIG. 2, however, the flight segments 39 are confined to the blending portion 21 of the mixer 20, and a continuous helical vane 40 secured to the shaft 32 extends from the blending portion 21 through the lower extension 23 into the inlet 25. Except for the fact that the embodiment of FIG. 1 has a vane that is interrupted throughout its length to form a plurality of segments and the embodiment of FIG. 2 has a combination of interrupted helical vane segments 39 and a continuous vane 40, the two embodiments are the same.

In the operation of the apparatus thus far described, scrap plastics material from the hopper 1 is delivered continuously to the mixer 20 by means of the feed auger 10 and virgin plastic pellets are delivered continuously by gravity to the mixer through the chute 30. The feed shaft 32 is rotated by the motor 34 continuously in such direction a to cause the flight segments 39 to drive the materials in the mixer 20 downwardly toward the extruder 26.

As is explained more fully in U.S. Pat. No. 4,108,334, material entrained by a rotating feed screw or auger normally does not rotate, but moves axially of the housing in which the feed screw is located. Thus, rotation of the shaft 32 and the interrupted vane segments 39 causes the contents of the sleeve directly beneath a segment to be subjected to compressive force urging the material downwardly of the mixer portions 21 and 23. Each time a segment rotates past the same portion of material, the axial space between two adjacent segments enables the compressed material to expand somewhat, thereby resulting in an alternating compression and expansion of the material. The expansion of the scrap material facilitates the introduction o virgin plastic pellets into the scrap material being delivered into the mixer, thereby resulting in mixing of the scrap and the virgin materials at the blending portion 21 of the mixer 20.

The bulk density of the mixed scrap and virgin materials in the mixer is determined by the relative densities and proportions of the scrap and virgin materials. The speed at which the feed screw 32 is rotated is selected initially to feed the mixture of scrap and virgin materials to the extruder 26 at such rate as to ensure filling of the spaces between adjacent flight convolutions of the extruder feed screw 27 and to correspond to the output of the extruder.

If the bulk density of the mixture increases, the feed rate of the mixture may be greater than that at which the blended mixture is discharged from the extruder. In this event the mixture within the mixer will be subjected to an ever increasing compaction force, thereby risking the possibility of generating undesirable heating of the materials of the mixture. As the compaction force increases, the compacted mixture will exert a reactive force on the feed screw 32 via the vane segments 39 and the vane 40 tending to lift or raise the feed screw 32 upwardly. Since the feed screw is axially movable, the reactive force is capable of moving the feed screw upwardly. Upward movement of the feed screw 32 is accompanied by corresponding movement of the drive motor 34 and its base 35, thereby relieving the compressive force to which the sensor 37 is subjected.

The sensor 37 may be set initially so that a predetermined decrease in the compressive force to which it is subjected will generate a signal which may be delivered through a connection 42 to a conventional control unit 43 which may be a Little Giant, MKT-LG-X microprocessor sold by Z World, Inc., Davis, Calif. The control unit 43 also is coupled by a connection 44 in known manner to the variable speed drive motor 34. The arrangement is such that relieving the compressive force on the load cell sensor 37 causes the control unit 43 to adjust the speed of the drive motor 34 in such manner as to slow the speed of rotation of the feed shaft 32, thereby reducing the quantity of the relatively high bulk density mixture which is delivered in a given time period to the extruder.

Should the bulk density of the mixture of virgin and scrap materials decrease, the reactive force applied on the feed shaft 32 by the mixture also will decrease. As a consequence, the weight of the shaft, the drive motor 34, and their associated parts will cause the feed shaft to move axially downwardly, thereby applying a greater compressive force on the sensor 37. Increasing the compressive force on the sensor will generate a signal that is transmitted to the control computer 43 causing faster rotation of the feed screw 32.

In the initial conditioning of the apparatus for use, the load cell sensor will be set so as to be responsive to either an increase or a decrease within a selected range in the reactive force applied on the feed screw by the mixed virgin and scrap materials. Thus, until the variation in the reactive force either increases or decreases beyond the selected range, no change in the rate of rotation of the feed screw will occur. When the reactive force varies beyond the selected range, however, the rate of rotation of the feed screw will be varied inversely of the change in the reactive force. For example, if it is desired to feed a selected quantity of mixed virgin and scrap materials per unit of time and the bulk density of the mixture changes due, say, to a reduction in thickness of the scrap from 2 mils to ½ mil, the rate of rotation of the feed screw must be increased substantially. Apparatus constructed according to the invention enables the feed screw speed to be regulated automatically to maintain substantially constant the mass or quantity of mixed material delivered to the extruder.

The disclosed embodiments are representative of presently preferred forms of the invention, but are intended to be illustrative rather than definitive thereof. The invention is defined in the claims.

I claim:

1. A method of regulating the rate of discharge of a mixture of virgin and scrap plastics materials having different densities in response to variations in the bulk density of such mixture, said method comprising delivering virgin plastic material to a mixer; delivering scrap plastic material to said mixer; mixing said virgin and scrap materials in said mixer to form a mixture of said materials having a bulk density; discharging the mixture of said materials from said mixer at a selected rate; sensing variations in bulk density of said mixture during the discharge of said mixture from said mixer; and adjusting the rate of discharge of said mixture in response to a selected variation in the bulk density of said mixture.

2. The method according to claim 1 including delivering said virgin material and said scrap material to said mixer simultaneously along separate paths.

3. The method according to claim 1 wherein said mixture is discharged from said mixer by applying a discharge force on said mixture, said mixture exerting a reactive force in opposition to said discharge force, and adjusting the rate of discharge of said mixture in inverse relation to variations in the reactive force.

4. The method according to claim 1 including periodically compacting and expanding the mixture of materials during the mixing and discharging of said mixture.

5. A continuous method of supplying a mixture of different density materials to a receiver comprising delivering materials having different densities from sources thereof to a mixer; mixing said materials in said mixer to produce a mixture of said materials having a bulk density value; applying on said mixture a driving force of such magnitude as to discharge a selected quantity of said mixture from said mixer per unit of time; sensing variations in the bulk density value of said mixture; and adjusting the rate of discharge of said mixture inversely to variations in the bulk density value of said mixture to maintain the selected quantity of discharged mixture.

6. The method according to claim 5 wherein the driving force applied on said mixture is a combination of that required to mix said materials and discharge the mixture of said materials.

7. The method according to claim 5 including applying said driving force by a rotatable auger in said mixer, said auger having an interrupted helical vane in engagement with the materials in said mixer.

8. The method according to claim 5 including applying said driving force by a rotatable and axially displaceable auger in said mixer, said auger having a helical vane in engagement with the materials in said mixer.

9. The method according to claim 8 wherein said vane is interrupted.

10. The method according to claim 8 wherein a portion of said vane is interrupted and the remainder of said vane is continuous.

11. The method according to claim 8 wherein the mixture of materials imposes a reactive force on said auger directly proportional to the bulk density of said mixture, said auger being axially displaceable in response to variations in said reactive force.

12. Apparatus for mixing materials having different densities to obtain a mixture having a bulk density within a selected range, said apparatus comprising a mixer; means for delivering a plurality of materials of different densities from sources thereof to said mixer; means in said mixer for mixing said plurality of materials to form a mixture thereof; drivable feed means for applying a force on said mixture of such magnitude as to discharge said mixture from said mixer; variable speed drive means coupled to said feed means for driving said feed means at variable rates of speed; sensing means for sensing variations in the force applied on said mixture by said feed means; and control means coupling said sensing means and said drive means for varying the rate of speed of said feed means in response to predetermined variations in magnitude of said force to maintain the bulk density of the mixture discharged from said receiver within said selected range.

13. Apparatus according to claim 12 wherein said sensing means comprises adjustable electrical load cell means on which said drive means is supported.

14. Apparatus according to claim 13 wherein said control means comprises computer means coupled to said load cell and to said drive means.

15. Apparatus according to claim 12 wherein said feed means comprises a rotatable auger having vane means engageable with the mixture in said receiver, said auger being axially movable in response to changes in bulk density of said mixture.

16. Apparatus according to claim 15 including means coupling said drive means to said auger for axial movements therewith.

17. Apparatus according to claim 16 including guide means for guiding the axial movements of said drive means with said auger.

18. Apparatus according to claim 15 wherein said vane means comprises a helical flight interrupted at intervals to form a plurality of axially and circumferentially spaced segments.

19. Apparatus according to claim 12 including a tubular extension in communication with said mixer for receiving said mixture therefrom, and wherein said feed means comprises a shaft extending through said mixer and said extension and having a plurality of axially and circumferentially spaced flight segments within said mixer and said extension.

* * * * *